(12) United States Patent
Dent

(10) Patent No.: US 9,140,286 B2
(45) Date of Patent: Sep. 22, 2015

(54) OMNIDIRECTIONAL BREAKAWAY SUPPORT SYSTEM AND CONNECTOR

(76) Inventor: Clifford Dent, Farmington, NM (US)

( * ) Notice: Subject to any disclaimer, the term of this patent is extended or adjusted under 35 U.S.C. 154(b) by 410 days.

(21) Appl. No.: 12/696,785

(22) Filed: Jan. 29, 2010

(65) Prior Publication Data

US 2010/0196084 A1 Aug. 5, 2010

Related U.S. Application Data (60) Provisional application No. 61/148,529, filed on Jan. 30, 2009.

(51) Int. Cl.
E01F 9/018 (2006.01)
F16D 9/00 (2006.01)
F16P 5/00 (2006.01)
F16B 31/02 (2006.01)
F16B 5/02 (2006.01)

(52) U.S. Cl.
CPC .................. F16B 31/021 (2013.01); F16B 5/02 (2013.01); *Y10T 403/11* (2015.01)

(58) Field of Classification Search
CPC ............... F16D 9/06; F16D 9/08; F16D 9/10; E01F 9/0182; F16B 5/02; F16B 31/02
USPC ........... 403/2, 167, 168, 299, 408.1; 411/2, 3, 411/5, 178, 383, 389, 395; 464/32, 33
See application file for complete search history.

(56) References Cited

U.S. PATENT DOCUMENTS

| | | | | |
|---|---|---|---|---|
| 1,391,633 A * | 9/1921 | Hazelton | ................... | 74/424.78 |
| 1,926,925 A * | 9/1933 | Wescott | ........................ | 403/296 |
| 3,027,631 A * | 4/1962 | Gerd | ................................ | 29/250 |
| 3,200,616 A * | 8/1965 | Hawkins | ......................... | 464/33 |
| 3,521,413 A * | 7/1970 | Scott et al. | ........................ | 52/98 |
| 3,623,394 A * | 11/1971 | Paine | ............................. | 411/391 |
| 3,967,906 A * | 7/1976 | Strizki | ............................. | 403/2 |
| 4,408,938 A * | 10/1983 | Maguire | ......................... | 411/71 |
| 4,528,786 A * | 7/1985 | Dinitz et al. | ..................... | 52/98 |
| 4,720,204 A * | 1/1988 | Johnson | ......................... | 403/24 |
| 4,923,319 A | 5/1990 | Dent | | |
| 5,474,408 A * | 12/1995 | Dinitz et al. | ..................... | 411/5 |
| 5,596,845 A * | 1/1997 | Strizki | ............................. | 52/98 |
| 6,056,471 A * | 5/2000 | Dinitz | ............................. | 403/2 |
| 6,210,066 B1 | 4/2001 | Dent | | |
| 6,880,224 B2 * | 4/2005 | Colarusso et al. | ............. | 29/456 |
| 6,959,902 B2 * | 11/2005 | Leahy | .......................... | 248/548 |
| 7,195,222 B2 | 3/2007 | Dent | | |
| 2004/0202521 A1 * | 10/2004 | Bostik | .............................. | 411/2 |

* cited by examiner

*Primary Examiner* — Gregory Binda
*Assistant Examiner* — Nahid Amiri
(74) *Attorney, Agent, or Firm* — Seed IP Law Group PLLC (57) ABSTRACT

A connector system having first and second connector segments held together by a rod threadably received in an internal axial bore through each of the first and second connector segments. Each connector segment has a breakaway portion formed from an angled face on one connector segment that cooperates with the mating angled face on the abutting connector segment to form a V-shaped breakpoint between the two connector segments. An intermediate segment can be positioned there between to provide two breakpoints, and multiple intermediate segments can be used for additional breakpoints. Upon impact, the system breaks at the breakpoint and only the rod needs to be in most cases. A longitudinal bore through the rod permits adaption of the rod to selected loads.

6 Claims, 4 Drawing Sheets

OMNIDIRECTIONAL BREAKAWAY SUPPORT SYSTEM AND CONNECTOR

BACKGROUND

1. Technical Field

The present disclosure relates to fasteners and, more particularly, to connectors used to attach support posts for road signs, guardrails, luminaires, and other objects to a support structure and, in addition, to a connector system utilizing these connectors.

2. Description of the Related Art

Applicant's prior patents in this field, including U.S. Pat. No. 4,923,319, U.S. Pat. No. 6,210,066, and U.S. Pat. No. 7,195,222, adequately describe the field of application of the present disclosure. Each of these issued patents is incorporated by reference herein in their entirety.

Briefly, highway signs, fences, luminaires, and guardrails frequently utilize a two-part support system in which a stub post anchored in the ground with one end projecting several inches above the ground forms a base for attachment of a signpost, light pole, guardrail, and the like. A mounting flange is formed on or attached to the projecting end of the stub post. The companion support post has a corresponding flange that is then bolted to the stub post flange.

Federal and state requirements regarding the installation of signposts, luminaires, guardrails, power poles, and the like impose certain requirements on the mounting structures used for these installations. For example, a rigid mounting assembly must be able to resist wind loads and light impacts while at the same time failing at a predetermined load, such as from a vehicle impact, to minimize damage to the support post and the vehicle and to reduce injuries.

Applicant's breakaway connector described in U.S. Pat. No. 4,923,319 has been widely recognized as facilitating these objectives. This connector has a breakpoint formed between two shoulders that bear against the respective stub post and support post or flanges to provide support while at the same time allowing the connector to break at the breakpoint when subjected to a load from any lateral direction. One disadvantage of the breakaway connector is that it is typically formed as a single integrated piece. As such, the connector can accommodate only one size of fastener (nut or bolt) and only one size of installation. In addition, there is no ability to provide for additional breakpoints, and the entire connector must be replaced in the event of damage to only a portion of the connector. In order to accomplish the foregoing, multiple connectors of different variations would have to be constructed and available for use, resulting in increased costs and material usage.

BRIEF SUMMARY

The present disclosure is directed to a support system that provides for detachment of support system components when subjected to a lateral load from any direction and to a connector having a unique construction for coupling signposts, light posts, guardrails, and similar structures to a support structure.

In accordance with one embodiment of the present disclosure, a connector is provided that includes a first connector segment having an exterior threaded portion, a breakaway portion with a shoulder adjacent the exterior threaded portion, and a longitudinal axial bore; a second connector segment having an exterior threaded portion, a breakaway portion with a shoulder adjacent the exterior threaded portion, and a longitudinal axial bore; and a rod having a size and shape to be receivable in the longitudinal axial bore of the first connector segment and the second connector segment.

In accordance with another aspect of the foregoing embodiment, the rod has a longitudinal axial bore formed at least partially there through.

In accordance with another aspect of the foregoing embodiment, the longitudinal axial bore of the first and second connector segments is threaded internally and the rod has external threads to be threadably received within the longitudinal axial bore of the first and second connector segments.

In accordance with another aspect of the foregoing embodiment, the connector further includes at least one intermediate breakaway segment having a first end adapted to bear against the breakaway portion of the first connector segment to form a breakaway point, a second end adapted to bear against the breakaway portion of the second connector segment to form a second breakpoint, and a longitudinal axial bore adapted to receive the rod.

In accordance with yet another aspect of the foregoing embodiment, the longitudinal axial bore of the at least one intermediate breakaway segment is internally threaded to threadably engage the exterior threads of the rod.

In accordance with another embodiment of the present disclosure, a connector is provided that couples a support member to a support structure, the connection having a first connector segment having an exterior threaded shaft, a breakaway portion on one end of the shaft, and a longitudinal axial bore formed through the exterior threaded shaft and the breakaway portion; a second connector segment having an exterior threaded shaft, a breakaway portion on one end of the shaft, and a longitudinal axial bore formed through the exterior threaded shaft and the breakaway portion; and a rod having external threads, the rod sized and shaped to engage internal threads in the longitudinal axial bore of the first and second connector segments to hold the breakaway portions of the first and second connector segments in an abutting relationship to form a breakpoint such that the connector will break at the breakpoint when subjected to a lateral load from any direction.

In accordance with another aspect of the foregoing embodiment, the breakaway portion of the first connector segment includes a flange adapted to bear against the post member and the breakaway portion of the second connector segment includes a flange adapted to bear against the support member, each flange of the breakaway portion having a first face substantially transverse to the longitudinal axial bore of the respective first and second connector segments, and a second face that extends from an outer edge of the flange towards the longitudinal axial bore such that when the first and second connector segments are placed in abutting relationship, the second faces form a V-shaped groove that defines the breakpoint.

In accordance with another aspect of the foregoing embodiment, the connector further includes at least one intermediate breakaway segment having first and second mutually opposed breakaway portions, and a longitudinal axial bore formed there through, the first and second breakaway portions each having a face that extends from an exterior edge of a central flange towards the longitudinal axial bore, the at least one intermediate breakaway segment adapted to be positioned between the first connector segment and the second connector segment and to cooperate with the breakaway portions of the respective abutting first and second connector segments to form two breakpoints wherein the second face of the abutting first and second connector segments and the face of the adjacent at least one intermediate breakaway segment define respective V-shaped grooves that form breakpoints that will break when subjected to a predetermined lateral load from any direction.

In accordance with another aspect of the foregoing embodiment, the at least one intermediate breakaway segment has internal threads on the longitudinal axial bore that threadably engage the rod.

In accordance with another aspect of the foregoing embodiment, the rod has a longitudinal axial bore formed at least partially there through.

In accordance with yet a further aspect of the present disclosure, the new connector system can screw directly into an embedded ground anchor system, which may include a drop in anchor or coupling or any type of concrete anchor forming a flush mount.

As will be readily appreciated from the foregoing, the present disclosure utilizes a connector having multiple parts that are held together by a center section. These parts can be intermixed using different sizes for different top and bottom application sizes. In most cases, all components are reusable. In use, the rod will shear and have to be replaced after impact. This new connector will facilitate repairs after impact and substantially reduce cost over the replacement of the entire breakaway bolt used on the national highway system today. This new design will also allow the usage of an outer slip plane that surrounds an adjustable breakaway center section, which can be adjusted for lighter breakaway devices. With this design, a construction crew can change the breakaway characteristics from a single breakpoint to a double, triple, or quadruple breakpoint by just adding additional intermediate breakaway connectors at the center section. Thus, the new connector will allow replacement of existing connectors currently in use on the national highway system, will be able to be used again without having to be replaced after an impact occurs, and will facilitate inventory stock requirements because of safety issues.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with signs, guardrails, luminaires, fences, and the like, including but not limited to their support posts, ground anchors, lights, signs, and related hardware, have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
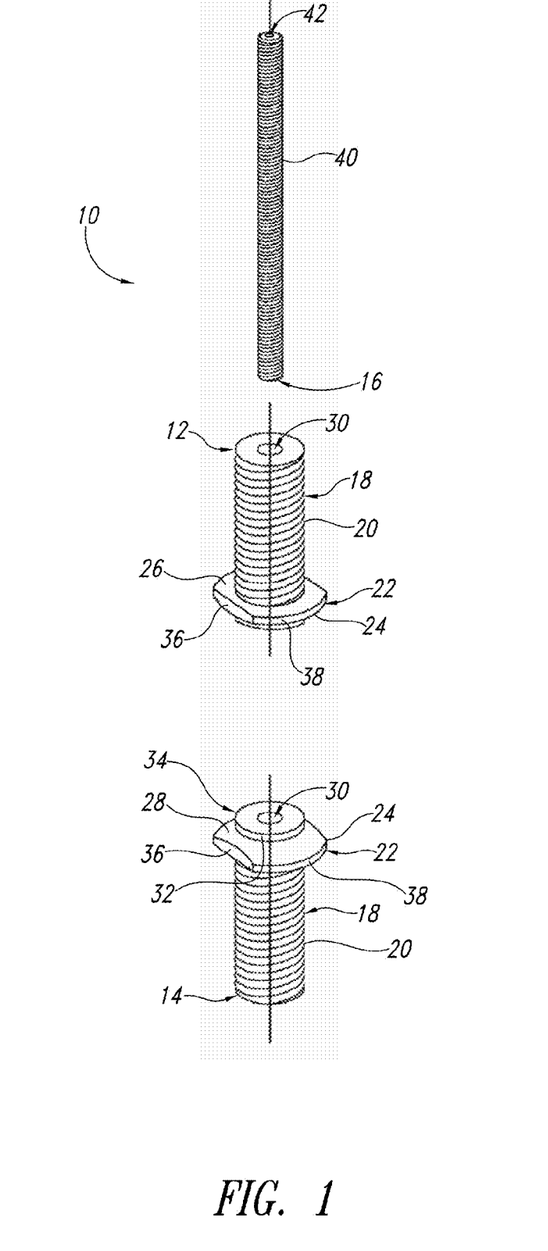
FIG. 1 is an exploded isometric view of a connector formed in accordance with one embodiment of the present disclosure.

Referring initially to FIG. 1, shown therein is a connector system 10 that includes a first connector segment 12, a second connector segment 14, and a rod 16 in an exploded configuration. Each connector segment 12, 14 has a shaft 18 with an exterior threaded section 20 on a substantial portion of the shaft and a breakaway section 22 on one end of the shaft 18. Each breakaway section 22 includes a radially extending flange 24 that has a first face 26 (seen more clearly on the first connector segment 12) that is substantially transverse to a longitudinal axis of the shaft 18 and is generally planar. The flange 24 also includes a second face 28 (seen more clearly in the view of the second connector segment 14 in FIG. 1) that extends from an edge 38 of the flange to a shoulder 32 that has a generally circular configuration around a ring-shaped extension that is formed around a longitudinal axial bore 30 of the shaft 18. The shoulder 32 circumscribes the non-threaded extension 34 on the end of the threaded section 20 on each connector segment 12, 14.

Wrench flats 36 can be formed on the edge 38 of each flange 24, preferably in pairs of opposing flats 36 as shown in FIG. 1. Ideally, the second face 28 is formed at an angle to the longitudinal axial bore 30 such that the second face 28 slopes away from the edge 38 and towards the shoulder 32.

The longitudinal axial bore 30 is formed completely through each of the first and second connector segments 12, 14, and it is of the same diameter and finish in each connector segment 12, 14. In a preferred embodiment, the interior of the longitudinal axial bore 30 has internal threads formed therein. The rod 16 has an elongate cylindrical configuration with external threads 40 formed along the exterior surface that are sized and shaped to be threadably engaged with the internal threads on the longitudinal axial bore 30 of the connector segments 12, 14. These threads can either be national coarse or national fine threads. Ideally the rod 16 has a length that when threadably received inside both the first and second connector segments 12, 14 in the position shown in FIG. 2, the rod 16 does not project more than one or two threads beyond the end of each of the connector segments 12, 14.

In a preferred embodiment, the rod 16 has its own internal axial bore 42 that may extend at least partially, and more preferably completely through the rod 16. The size of the bore will be determined by the application, as will be explained in more detail herein below.

Figure 2:
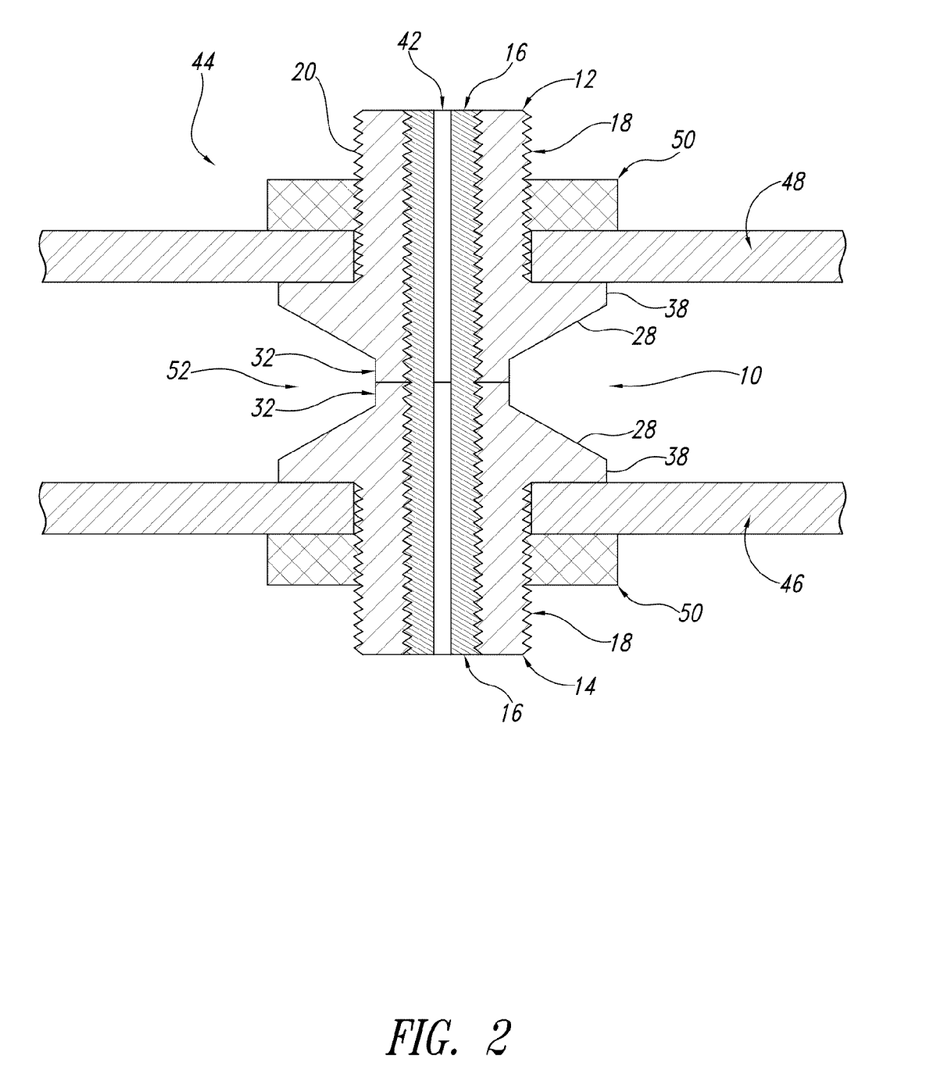
FIG. 2 is a cross-sectional side view of the connector of FIG. 1 installed in an assembly.

FIG. 2 is a cross-sectional illustration of an installation 44 of the connector system 10 of FIG. 1. The installation 44 includes a support structure 46 on the bottom and a supporting member 48 on the top that are held together by the connector system 10. The support structure 46 may be a stub post or other member, such as a base, concrete anchor, drop-in anchor, couplings, or other types of flush mounted ground anchors or systems to which a signpost, guardrail, luminaire, etc., can be attached. The supporting member 48 generally represents a post member, such as a signpost, guardrail, luminaire, or attaching member for the same that is to be securely fastened to the support structure 46 or a concrete anchor, drop in anchor, couplings, or other types of flush mounted ground anchor systems. Using a flush mounted ground anchor system, the plate 46 will not be used. Rather, the threaded section of the rod 16 would be screwed directly into the ground anchor system.

Although only one connector system 10 is shown in FIG. 2, it is to be understood that this is a representative embodiment showing the relationship of the components. The illustrated installation 44 can be a portion of a larger installation in which multiple connector systems 10 are used. Moreover, while the installation 44 shown in FIG. 2 has a vertical orientation, it is to be understood that it can have any orientation, such as horizontal or any angle between vertical and horizontal, as dictated by the needs of the application.

In the installation of FIG. 2, it can be seen that the first connector segment 12 is held in abutting relationship with the second connector segment 14 by the internal threading of the rod 16 through both of the connector segments 12, 14. The shaft 18 of each connector segment 12, 14 extends through an opening in the respective support structure 46 or in a ground support system as described above and supporting member 48, which openings need not be threaded although they can be threaded. In addition, the shaft 18 may have the threads terminate a predetermined distance above the first face 26 of the flange 24 to create a smooth shank section that is received through and bears against the respective support structure 46 and supporting member 48.

As shown in FIG. 2, each of the connector segments 12, 14 are held in position by a nut 50. The first and second connector segments 12, 14 are held with their non-threaded extensions 34 in abutting relationship by the rod 16.

The connector system is preferably manufactured from high-strength steel, stainless steel, or any other high-strength material (usually round stock) and finished with a lathe or screw machine. Both of the shafts 18 are of the same size and thread type unless different sizes on opposite ends of the connector system 10 are required. The threaded section 20 is formed on the shaft 18 in a conventional manner to the specified size and type. The longitudinal axial bore is drilled and tapped to receive the rod 16, which holds the connector system 10 together. The wrench flats 36 are then added to the flanges 24 to enable easy tightening of the parts together and to prevent twisting off or loosening of the rod 16 or other components.

The longitudinal axial bore 42 in the rod 16 acts as a shear area. In other words, the rod, which can be drilled completely or partially through the center section, acts as a locking device as well as a shear device. During an impact to one or the other or both of the support structure 46 and the supporting member 48 from any lateral direction, the rod 16 will shear or break at the intersection of the first and second connector segments 12, 14. As shown in FIG. 2, the angled second faces 28 of each connector segment 12, 14 angles toward the other to form a substantially V-shaped groove 52 that creates a pre-formed stress point or break point. In one embodiment, the shoulders 32 form a flat area at the bottom of the groove 52. This shoulder area 32, in most cases, is at least as large or larger than the bolt thread size of the connector segments 12, 14. As an example, if the connector segments 12, 14 have one-inch threads, then the size of the shoulder 32 will be at least the size of the threads, i.e. one inch. (In FIG. 2 the shoulder 32 will appear smaller in diameter then the thread size of the connector segments 12, 14.)

The size of the longitudinal bore inside the rod 16 as well as the size of all of the components and their material strength determines the amount of load the connector can bear before it will break. With this construction, replacement of existing connectors that are damaged due to impact is facilitated because both the first and second connector segments can be reused and only the rod 16 needs to be replaced, in most cases.

To install the connector system 10, the first and second connector segments 12, 14 are attached together by the rod 16 and torqued down to not exceed 80 foot-pounds. This assembly is then inserted into the openings in the respective support structure 46 and supporting member 48, and they are held in place by the nuts 50. There are no torque requirements for the nuts 50. The wrench flats 36 are used to tighten the first and second connector segments 12, 14 into their abutting relationship as shown in FIG. 2. This eliminates the need to have the rod 16 formed with a socket or other structure in one or both ends to accommodate a tool.

Figure 3:
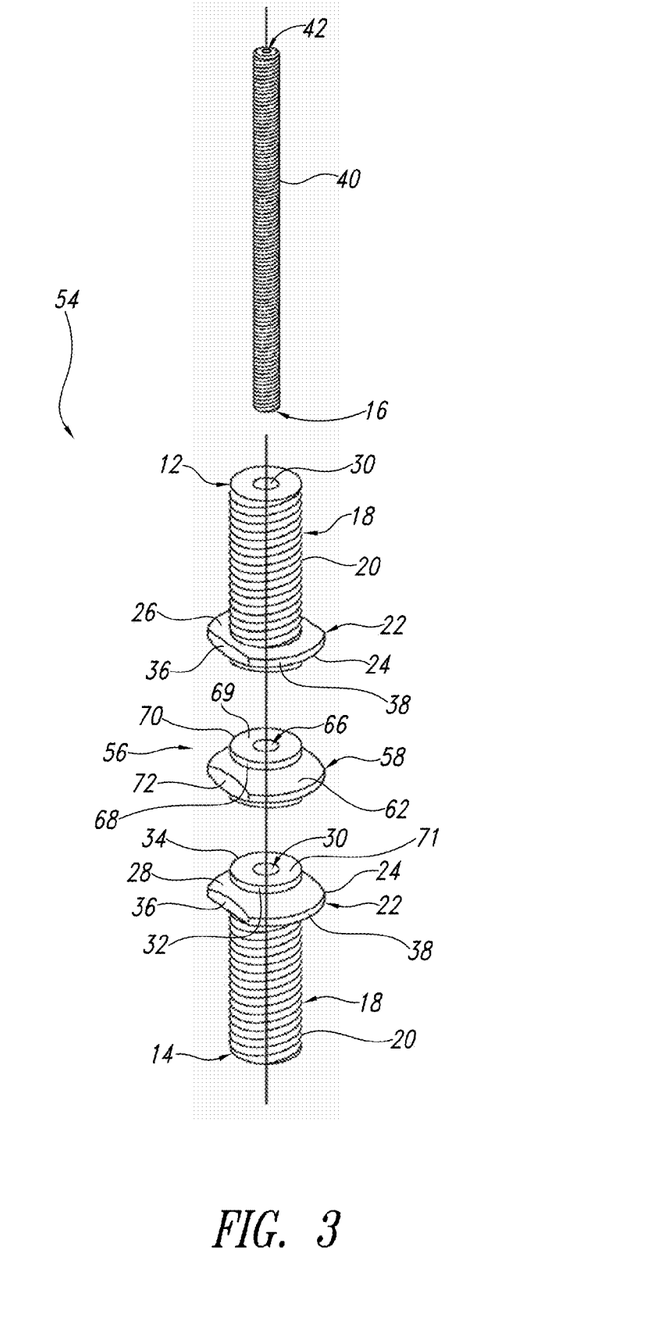
FIG. 3 is an isometric exploded view of a second embodiment of a connector formed in accordance with the present disclosure.

Turning next to FIG. 3, shown therein is an alternative embodiment of a connector system 54 formed in accordance with the present disclosure. For ease of reference, like reference numbers are used for like components shown in FIGS. 1 and 2. The additional element in the exploded view of FIG. 3 is the intermediate breakaway segment 56 positioned between the first and second connector segments 12, 14. The intermediate segment 56 has a central flange 58 with an external edge 60 and two faces 62, 64 (shown more clearly in FIG. 4) angling away from the edge 60 and towards a longitudinal axial bore 66 formed through the intermediate segment 56. Similar to the breakaway section 22 of the first and second connector segments 12, 14, each of the faces 62, 64 terminate at a shoulder 68 that is part of a ring-like circumscribing extension 70 through which the bore 66 is formed. Wrench flats 72 are formed in the edge 60 of the flange 58, preferably in opposing pairs as shown.

This intermediate segment 56 is sized and shaped to be positioned adjacent the breakaway sections 22 of the first and second connector segments 12, 14 to form multiple breakpoints.

Figure 4:
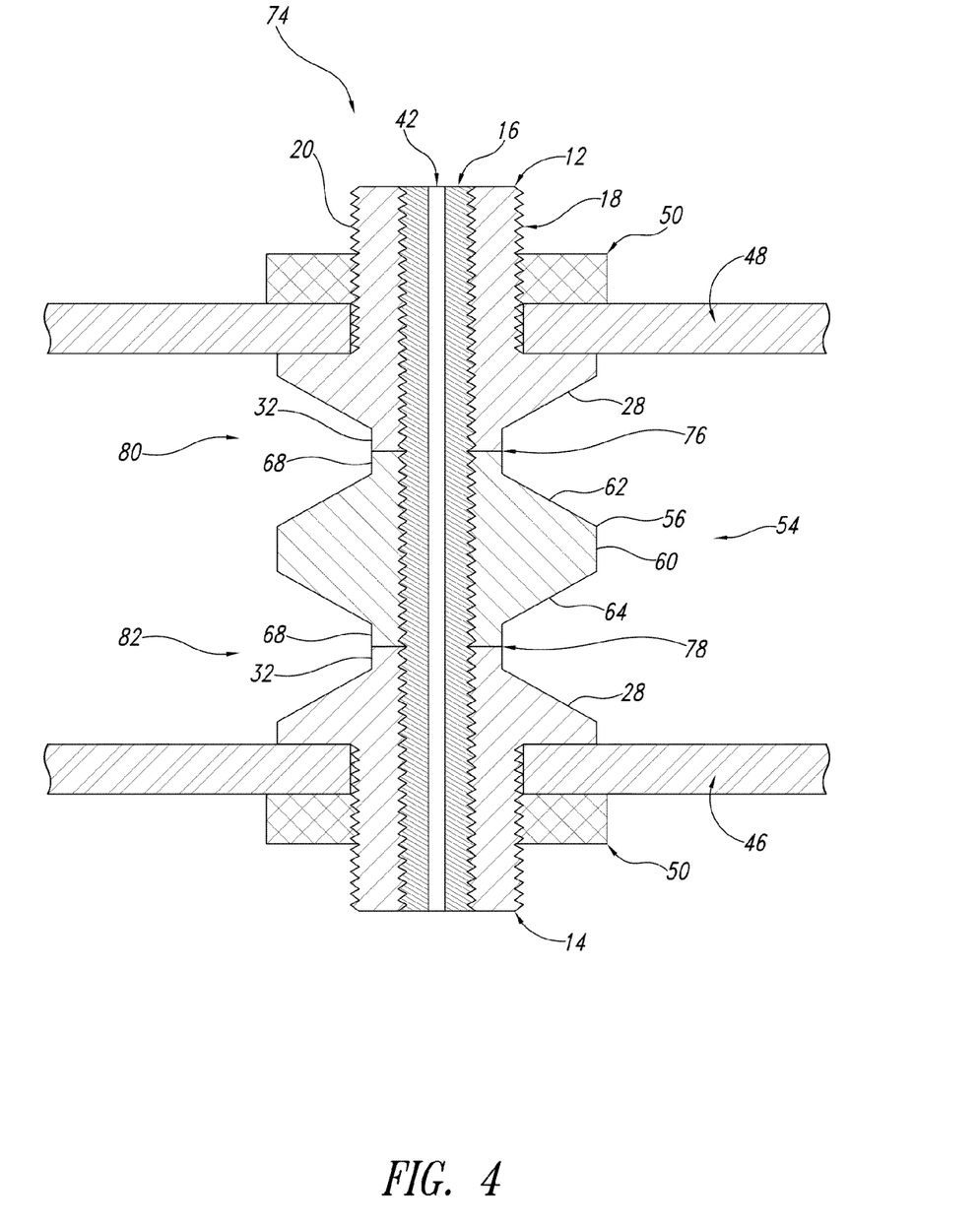
FIG. 4 is a cross-sectional side view of the embodiment of FIG. 3 installed in an assembly.

Referring in particular to FIG. 4, shown therein is an installation 74 utilizing the connector system 54 of FIG. 3. Again, like reference numbers have been used for like components for ease of reference.

As seen here, the intermediate segment 56 is positioned between the first and second connector segments 12, 14 in abutting relationship. In other words, the end face 69 (shown in FIG. 3) on each side of the intermediate segment 56 abuts the respective end face 71 (shown in FIG. 3) of each of the first and second connector segments 12, 14. These components 12, 14, and 56, are held in abutting relationship by the rod 16 threadably received within the internal axial bore 30 of the first and second connector segments 12,14 and the bore 66 of the intermediate segment 56. In this installation 74, the length of the rod 16 is determined by the total length of the first and second connector segments 12, 14 and intermediate segment 56 in their abutting relationship as shown in FIG. 4.

When so connected, the connector system 54 provides two breakpoints, a first breakpoint 76 and second breakpoint 78 on either side of the intermediate segment 56. More particularly, each breakpoint is formed by the converging of the faces of the respective components, i.e., first face 62 on intermediate segment 56 converging with the second face 28 on the first connector segment 12 and the second face 64 converging with the second face 28 of the second connector segment 14, thus forming two V-shaped grooves 80, 82. Here, the shoulders 32, 68 form a flat area at the bottom of each groove 80, 82.

It is to be understood that while preferred embodiments have been illustrated and described, variations can be made without departing from the spirit and scope of the invention. For example, the angled faces 28, 62, 64 can have a convex or concave configuration as well as the planar configuration or finish shown in the figures. In addition, the first connector segment 12 can be of a different size with respect to its diameter and length, as well as different type thread construction, while still having internal threads that are threadable with the threads on the rod 16. This enables adapting the connector system to a support structure of a first size and a supporting member of a second size. Again, varied diameters may be used for the longitudinal axial bore 42 in the rod 16. In other words, the bore can be formed to have a uniform diameter that is either narrow or wide, depending on the desired load bearing strength and desired breaking load for the system.

In another application, the new connector system can screw directly into an embedded ground anchor system, which may include a drop in anchor or coupling or any type of concrete anchor forming a flush mount The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A three-piece breakaway connector, consisting of:
   a first connector component having an exterior threaded portion, a breakaway portion adjacent the exterior threaded portion, and a longitudinal axial bore of constant diameter formed completely through the first connector component;
   a second connector component having an exterior threaded portion, a breakaway portion adjacent the exterior threaded portion, and a longitudinal axial bore of constant diameter formed completely through the second connector component; and
   a single rod having a constant diameter that is the same size as the longitudinal axial bore of the first connector component and the second connector component and configured to threadably engage and extend completely through the longitudinal axial bore of both the first and second connector components to couple the first and second connector components together and to hold the breakaway portion of the first connector component in an abutting relationship with the breakaway portion of the second connector component, the breakaway portions of the first and second connector components cooperating to form a single breaking point on the rod at the intersection of the first and second connector components when the first and second connector components are threadably engaged with the single rod in an abutting relationship, the rod configured to break only at the location of the single breaking point defined by the first and second connector components and to separate the first and second connector components from the abutting relationship when the connector is subjected to a lateral load in response to any impact.

2. The connector of claim 1 wherein the rod has a longitudinal axial bore formed at least partially there through and configured as a shear point to cooperate with the breaking point formed by the first and second connector components.

3. The connector of claim 1 wherein the longitudinal axial bore of the first and second connector components is threaded internally and the rod has external threads to be threadably received within the threaded longitudinal axial bore of the first and second connector components.

4. The connector of claim 1 wherein the first and second components are adapted to be connected together by the rod with their respective breakaway portions abutting each other to form a single preformed stress point comprising a V-shaped annular groove formed by corresponding flanges on the breakaway portions of the first and second connector components such that, when the connector is subjected to a lateral load from any direction, the connector will break at only the single preformed stress point.

5. A connector for coupling a post member to a support member, comprising:
   a first connector component having an exterior threaded shaft, a breakaway portion with an end face on one end of the shaft, and a longitudinal axial bore of constant diameter formed entirely through the first connector component, including the exterior threaded shaft and the breakaway portion and having internal threads;
   a second connector component having an exterior threaded shaft, a breakaway portion with an end face on one end of the shaft, and a longitudinal axial bore of constant diameter formed entirely through the second connector component, including the exterior threaded shaft and the breakaway portion and having internal threads; and
   a single rod of constant diameter having external threads, the rod configured to extend completely through the longitudinal axial bore of each of the first and second connector components and to threadably engage the internal threads in the longitudinal axial bore of the first and second connector components to hold the end faces of the respective breakaway portions of the first and second connector components in an abutting relationship to form a breakpoint for the rod where the end faces of the first and second connector components abut such that the rod will break at the breakpoint when the first and second connector components are threadably engaged with the single rod in an abutting relationship, the rod configured to break only at the location of the single breaking point defined by the first and second connector components and to separate the first and second connector components from the abutting relationship when the connector is subjected to a lateral load in response to any direction.

6. The connector of claim 5 wherein the breakaway portion of the first connector component comprises a flange adapted to bear against the post member and the breakaway portion of the second connector component comprises a flange adapted to bear against the support member, each flange of the breakaway portion having a first face substantially transverse to the longitudinal axial bore of the respective first and second connector components, and a second face that extends from an outer edge of the flange towards the longitudinal axial bore such that when the first and second connector components are placed in abutting relationship, the second faces cooperate to form a V-shaped groove that defines the breakpoint.

\* \* \* \* \*

UNITED STATES PATENT AND TRADEMARK OFFICE
CERTIFICATE OF CORRECTION

| | | |
|---|---|---|
| PATENT NO. | : 9,140,286 B2 | Page 1 of 1 |
| APPLICATION NO. | : 12/696785 | |
| DATED | : September 22, 2015 | |
| INVENTOR(S) | : Clifford Dent | |

It is certified that error appears in the above-identified patent and that said Letters Patent is hereby corrected as shown below:

In the Claims

Column 8, Line 58:
"response to any direction." should read, --response to an impact from any direction.--.

Signed and Sealed this
Tenth Day of May, 2016

Michelle K. Lee
*Director of the United States Patent and Trademark Office*